US006432193B1

(12) United States Patent
Flatt et al.

(10) Patent No.: US 6,432,193 B1
(45) Date of Patent: *Aug. 13, 2002

(54) PROCESS FOR THE CONTINUOUS DROWNING OF PERYLENE MELT

(75) Inventors: Thomas R. Flatt, Summerville, SC (US); Richard Kent Faubion, Leverkusen (DE); Mark A. Putnam, Hanahan, SC (US); Ulrich Feldhues, Mt. Pleasant, SC (US); Richard A. Vogel, Charleston, SC (US)

(73) Assignee: Bayer Corporation, Pittsburgh, PA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/461,918

(22) Filed: Dec. 15, 1999

(51) Int. Cl.$^7$ ............................. C09B 5/62; C09B 67/20; C09B 3/14; C08H 17/14
(52) U.S. Cl. ........................................ 106/498; 546/37
(58) Field of Search .............................. 106/498; 546/37

(56) References Cited

U.S. PATENT DOCUMENTS

| | | | | | |
|---|---|---|---|---|---|
| 4,189,582 A | * | 2/1980 | Hoch et al. | ..................... | 546/37 |
| 4,217,455 A | * | 8/1980 | Hoch et al. | ..................... | 546/37 |
| 4,286,094 A | * | 8/1981 | Hoch et al. | ..................... | 546/37 |
| 4,588,814 A | | 5/1986 | Spietschka et al. | ............ | 546/37 |
| 5,247,088 A | | 9/1993 | Flatt | ............................. | 546/37 |

OTHER PUBLICATIONS

W. Herbst and K. Hunger, Industrial Organic Pigments, 2nd ed. (New York: VCH Publishers, Inc., (month unavailable) 1997, pp. 476, Perlyene Pigments.

H. Zollinger, Color Chemistry (VCH Verlagsgessellschaft, —month unavailable —1991) pp. 227–228, Higher Anellated Vat Dyes.

BIOS, p. 21, 1484, Perylene tetracarboxylic acid diimide (date unavailable).

* cited by examiner

Primary Examiner—Anthony J. Green
(74) Attorney, Agent, or Firm—Joseph C. Gil; Thomas W. Roy; Richard E. L. Henderson

(57) ABSTRACT

This invention relates to a continuous process for preparing perylenes by (a) continuously mixing a melt of the leuco form of a perylene tetracarboxylic diimide obtained by alkaline fusion of naphthalimide with a continuous water-containing stream containing (1) 2 to 50 parts of water per part of melt, (2) 0 to $X^1$ moles of oxidizing agent per mole of the leuco form, (3) 0 to $Y^1$ parts by weight of processing additives, based on the leuco form, and (4) 0 to $Z^1$ parts by weight of an acid, based on the leuco form of the perylene tetracarboxylic diimide, to form a slurry; and (b) optionally mixing the slurry in one or more continuous or batchwise steps with a second stream containing (1) 0 to 10 parts by weight of water, based on the slurry, (2) 0 to $X^2$ moles of oxidizing agent per mole of the leuco form of the perylene tetracarboxylic diimide, with the proviso the total of $X^1$ and $X^2$ represents at least the molar amount of oxidizing agent theoretically needed to oxidize all of the leuco form of the perylene tetracarboxylic diimide, (3) 0 to $Y^2$ parts by weight of processing additives, based on the leuco form of the perylene tetracarboxylic diimide, with the proviso that the total of $Y^1$ and $Y^2$ is from 0 to 5 parts, and (4) 0 to $Z^2$ parts by weight of an acid, based on the leuco form of the perylene tetracarboxylic diimide, to give a perylene pigment.

19 Claims, No Drawings

PROCESS FOR THE CONTINUOUS DROWNING OF PERYLENE MELT

BACKGROUND OF THE INVENTION

This invention relates to a novel continuous process for preparing perylene pigments having controllable particle shape, size, and size distribution. Of particular interest is the more desirable oval particle having a particle size between 15 nm and 75 nm and a narrow size distribution. Peryienes, particularly the diimides and dianhydrides of perylene-3,4, 9,10-tetracarboxylic acid, can be unsubstituted or substituted (for example, with one or more alkyl, alkoxy, halogens such as chlorine, or other substituents typical of perylene pigments), including those that are substituted at imide nitrogen atoms with chemically reasonable groups such as alkyl. Crude perylenes can be prepared by methods known in the art by alkaline fusion of naphthalimides. For example, perylene melts can be prepared by mixing a naphthalimide in molten mixtures of caustic (usually caustic potash) and alkali metal carboxylates (usually sodium acetate) at high temperatures to form the non-pigmentary leuco form of a perylene tetracarboxylic diimide as a metal salt. This melt is usually drowned batchwise in water and then oxidized with air at elevated temperatures to give the pigment. E.g., W. Herbst and K. Hunger, *Industrial Organic Pigments*, 2nd ed. (New York: VCH Publishers, Inc., 1997), page 476; H. Zollinger, *Color Chemistry* (VCH Verlagsgessellschaft, 1991), pages 227–228; and BIOS Final Report, 1484, page 21. The particles formed using this general procedure usually range from submicron size to several microns in size with a very wide size distribution.

Continuous processes for the preparation of perylene pigments are known. For example, U.S. Pat. No. 5,247,088 discloses a process in which the leuco form of perylene tetracarboxylic diimide is formed continuously and then drowned and oxidized batchwise. However, the reported processes do not disclose a continuous drowning and oxidation step that forms pigmentary perylenes while at the same time allowing control of particle size. The preparation of pigments having small particle sizes and a narrow size distribution is not achievable by conventional drowning processes, which generally give much larger particle sizes and very wide size distributions. The present invention overcomes such disadvantages.

SUMMARY OF THE INVENTION

This invention relates to a continuous process for preparing perylenes comprising (a) continuously mixing a melt of the leuco form of a perylene tetracarboxylic diimide obtained by alkaline fusion of naphthalimide with a continuous water-containing stream comprising
  (1) 2 to 50 parts by weight (preferably 4 to 20 parts by weight) of water per part by weight of the melt,
  (2) 0 to $X^1$ moles of oxidizing agent per mole of the leuco form of the perylene tetracarboxylic diimide,
  (3) 0 to $Y^1$ parts by weight of processing additives, based on the leuco form of the perylene tetracarboxylic diimide, and
  (4) 0 to $Z^1$ parts by weight of an acid, based on the leuco form of the perylene tetracarboxylic diimide, to form a slurry;
(b) optionally mixing the slurry in one or more continuous or batchwise steps with a second stream comprising
  (1) 0 to 10 parts by weight of water, based on the weight of the slurry,
  (2) 0 to $X^2$ moles of oxidizing agent per mole of the leuco form of the perylene tetracarboxylic diimide, with the proviso the total of $X^1$ and $X^2$ represents at least the molar amount (preferably from 1 to 10 times the molar amount, more preferably from 2 to 6 times the molar amount) of oxidizing agent theoretically needed to oxidize all of the leuco form of the perylene tetracarboxylic diimide,
  (3) 0 to $Y^2$ parts by weight of processing additives, based on the leuco form of the perylene tetracarboxylic diimide, with the proviso that the total of $Y^1$ and $Y^2$ is from 0 parts by weight (i.e., no additives are present) to 50 parts by weight (preferably 0 to 5 parts by weight), and
  (4) 0 to $Z^2$ parts by weight of an acid, based on the leuco form of the perylene tetracarboxylic diimide, to give a perylene pigment;
(c) optionally, isolating the perylene pigment; and
(d) optionally, conditioning the perylene pigment.

DETAILED DESCRIPTION OF THE INVENTION

The process of the invention is accomplished by continuously mixing a melt of the leuco form of a perylene tetracarboxylic diimide with a drowning medium in one or more steps, at least the first of which is carried out using a continuous aqueous stream and at least one of which includes an amount of oxidizing agent theoretically sufficient to oxidize all of the leuco form of the perylene tetracarboxylic diimide.

Suitable oxidizing agents are capable of oxidizing the leuco form of the perylene tetracarboxylic diimide to form the desired pigment form, preferably without causing significant decomposition. Examples of suitable oxidizing agents include oxygen (including substantially pure $O_2$, air and other gas mixtures containing oxygen, or ozone), persulfates (such as potassium persulfate), nitrobenzenesulfonic acid salts (such as the sodium salt), nitrates, chlorates, hydrogen peroxide (preferably in a concentration between 0.5% and 10%), adducts of hydrogen peroxide and borates, hypochlorites, and other known oxidizing agents.

The leuco form of a perylene tetracarboxylic diimide is obtained as a melt by alkaline fusion of naphthalimide using known methods. A method is described in U.S. Pat. No. 5,247,088, which is herein incorporated by reference.

In the first step of the process of the invention, the leuco-form melt is continuously mixed with a stream of liquid ("the drowning medium") containing from 2 to 50 parts by weight of water per part by weight of the melt to form a slurry. The drowning medium used in the first step can optionally contain all or part of the oxidizing agent theoretically needed to oxidize the leuco form to the colored form as long as the total theoretical amount is added at some step in the overall process.

The drowning liquid used in the first step can also include various processing additives that help maintain particle size and prevent agglomeration, as well as enhance the efficiency of the oxidation process. It is also possible to add processing additives in later steps as long as the total amount of the additives does not exceed 50 parts by weight (preferably 0 to 5 parts by weight) based on the leuco form of the perylene tetracarboxylic diimide. Suitable processing additives include dispersants or surfactants, metal salts, and various pigment derivatives. Examples of suitable dispersants include anionic compounds, such as fatty acids (e.g., stearic or oleic acid), fatty acid salts (i.e., soaps such as alkali metal salts of fatty acids), fatty acid taurides or N-methyltaurides, alkylbenzenesulfonates, alkylnaphthalenesulfonates, alkylphenol polyglycol ether sulfates, naphthenic acids or resin acids (such as abietic acid); cationic compounds, such as quaternary ammonium salts, fatty amines, fatty amine ethylates, and fatty amine polyglycol ethers; and nonionic compounds, such as fatty alcohol polyglycol ethers, fatty alcohol polyglycol esters, and alkylphenol polyglycol ethers. Examples of suitable metal salts include various salts of alkali metals (such as lithium, sodium, and potassium), alkaline earth metals (such as magnesium, calcium, and barium), aluminum, transition and other heavy metals (such as iron, nickel, cobalt, manganese, copper, and tin), including, for example, the halide (especially chloride), sulfate, nitrate, phosphate, polyphosphate, sulfonate (such as methanesulfonate or p-toluenesulfonate, or even known quinacridone sulfonate derivatives), and carboxylate salts, as well as the oxides and hydroxides. Examples of suitable pigment additives include organic pigments having one or more sulfonic acid groups, sulfonamide groups, carboxylic acid, carboxamide, and/or (hetero)aryl-containing (cyclo) aliphatic groups.

The drowning liquid used in the first step can also include an acid to neutralize all or part of the alkali from the alkaline melt or can even be used in excess to acidify the mixture. The acid can even help maintain particle size and prevent agglomeration, as well as enhance the efficiency of the oxidation process. It is also possible to add all or part of the acid in later steps. However, if the mixture is not to be made acidic, the total amount of acid should not exceed the amount needed to neutralize the alkali. Examples of suitable acids include mineral acids such as sulfuric acid, hydrochloric acid, and phosphoric acid.

The first step of the invention is preferably carried out using equipment that provides intensive mixing, particularly a system equipped with one or more nozzles. The nozzles can be of the type that will have good mixing at the point of initial contact of the melt and drowning streams. The points of introduction of the streams are separated by piping of appropriate length depending on the diameter of the pipe and flow of product being introduced. Examples of suitable nozzles are simple tee type where the side stream is introduced at elevated pressures or ring type nozzles. An in-line rotor stator mixer can be substituted for either of the nozzles as long as the two streams are contacted at or in the entrance of the rotor stator system. The melt can be introduced into the first nozzle either as the smaller side stream or as the main stream, and the aqueous drowning medium (which can include oxidizing agent, processing additives the types used in the first step, or combinations thereof) is introduced into the remaining nozzle port.

It is generally preferable to pressurize the melt, the drowning medium, or both streams. If pressurized at all, the melt can be pressurized at positive pressures of up to 10,000 psi (more preferably from 50 to 2500 psi, particularly from 100 to 1000 psi). The continuous water-containing stream, if pressurized at all, can similarly be pressurized at positive pressures of up to 10,000 psi (more preferably from 10 to 500 psi, particularly from 60 to 250 psi).

The temperature at which step (a) is carried out is generally not critical as long as it is not so high that undesirable side reactions occur (or solvents boil away in unpressurized systems). It is generally possible to use drowning media at temperatures between the freezing point and the boiling point, depending on the pressures being used. The temperature selected will also be dependent on the pigmentary properties desired. It is particularly desirable to maintain a relatively constant temperature that varies within a narrow range of about ±2° C.

If all of the oxidizing medium is introduced into the first nozzle, a second step can optionally be used for additional dilution of the stream or for introducing a processing additive. If the oxidizing agent is not added or is only partly added in the first step, the required amount can be added either through a second nozzle (when carrying out the second step continuously) or even in a collection tank (when carrying out the second step in a batchwise manner).

When a second stream is used, it is generally preferable to pressurize the second stream. The second stream, if pressurized at all, can be pressurized at positive pressures of up to 10,000 psi (more preferably from 10 to 500 psi, particularly from 60 to 250 psi). Regardless of the particular variant use, the side stream is typically introduced into the main stream at a higher pressure. It is also generally desirable to maintain a relatively constant temperature that varies within a narrow range of about ±2° C. However, the actual temperature will be dependent on the ratio and temperature of the two streams that are being mixed.

Regardless of the number of steps used, the drowned pigment is obtained as a slurry that can be isolated using methods known in the art and then dried if desired. Collection methods known in the art include filtration, centrifugation, microfiltration, or even simple decantation. Preferred collection methods include continuous filtration using, for example, belt filtration, rotary drum filtration, ultrafiltration, or the like.

Final particle size of the perylene pigment can be further controlled by one or more optional conditioning steps. However, the small particles achieved using the combined drowning and oxidation of the invention are already smaller than particles typically obtained using conventional size reduction steps such as dry or wet milling. The smaller particles obtained by the present invention often do not require additional conditioning steps, thereby providing a further economic advantage. An additional advantage of the continuous process of the present invention is the controllable and repeatable conditions, which leads to consistent and uniform products even when larger needle shaped particles are desired.

Because of their light stability and migration properties, perylene pigments prepared according to the present invention are suitable for many different pigment applications. For example, pigments prepared according to the invention can be used as the colorant (or as one of two or more colorants) for very lightfast pigmented systems. Examples include pigmented mixtures with other materials, pigment formulations, paints, printing ink, colored paper, or colored macromolecular materials. The term "mixtures with other materials" is understood to include, for example, mixtures with inorganic white pigments, such as titanium dioxide (rutile) or cement, or other inorganic pigments. Examples of pigment formulations include flushed pastes with organic liquids or pastes and dispersions with water dispersants, and, if appropriate, preservatives. Examples of paints in which pigments of this invention can be used include, for example, physically or oxidatively drying lacquers, stoving enamels, reactive paints, two-component paints, solvent- or water-based paints, emulsion paints for weatherproof coatings, and distempers. Printing inks include those known for use in paper, textile, and tinplate printing. Suitable macromolecular substances include those of a natural origin, such as rubber; those obtained by chemical modification, such as acetyl cellulose, cellulose butyrate, or viscose; or those produced synthetically, such as polymers, polyaddition products, and polycondensates. Examples of synthetically produced macromolecular substances include plastic materials, such as polyvinyl chloride, polyvinyl acetate, and polyvinyl propionate; polyolefins, such as polyethylene and polypropylene; high molecular weight polyamides; polymers and copolymers of acrylates, methacrylates, acrylonitrile, acrylamide, butadiene, or styrene; polyurethanes; and polycarbonates. The materials pigmented with perylene pigments prepared according to the present invention can have any desired shape or form. Pigments prepared according to the invention are particularly suitable for use in automotive, industrial, and architectural coatings.

The perylene pigments prepared according to this invention are highly water-resistant, oil-resistant, acid-resistant, lime-resistant, alkali-resistant, solvent-resistant, fast to over-lacquering, fast to over-spraying, fast to sublimation, heat-resistant, and resistant to vulcanizing, yet give a very good tinctorial yield and are readily dispersible (for example, in plastic materials).

The following examples further illustrate details for the process of this invention. The invention, which is set forth in the foregoing disclosure, is not to be limited either in spirit or scope by these examples. Those skilled in the art will readily understand that known variations of the conditions of the following procedures can be used. Unless otherwise noted, all temperatures are degrees Celsius and all percentages are percentages by weight.

EXAMPLES

Example 1

A perylene fusion melt prepared in a manner similar to that described in Example 1 of U.S. Pat. No. 5,247,088 was drowned continuously as follows. The melt, which contained 1 part by weight of naphthalimide, 3 parts by weight of potassium hydroxide flakes, and 0.5 parts by weight of sodium acetate, was mixed in a heated screw type reactor at 280° C. before being introduced at a rate of 0.7 kg/min into the center bore of a ring-type nozzle. A 10 kg/min stream of water containing 3% potassium persulfate as the oxidizing agent was simultaneously introduced into the nozzle as a side stream at a pressure of 100 to 125 psi. Perylenetetracarboxylic diimide pigment was then collected using a filterpress. The particles of the pigment were oval shaped and had a particle size ranging from 15 to 75 nm.

Example 2

Example 1 was repeated except for using 2 parts of potassium hydroxide flakes in the fusion melt and a 5 kg/min stream of 4% hydrogen peroxide as the side stream. The particles of the resultant pigment were oval shaped and had a particle size ranging from 15 to 75 nm.

Example 3

A perylene fusion melt prepared in the same manner as Example 1 (see also Example 1 of U.S. Pat. No. 5,247,088) was drowned continuously by being introduced at a rate of 0.7 kg/min into a stream of water having a temperature of 30° C. The resultant slurry was collected in a vessel to which was then added 3% aqueous potassium persulfate. The resultant perylene pigment was then collected by passing the oxidized pigment slurry through a filterpress.

Solvent-based Paint Tests

Samples of perylenetetracarboxylic diimide prepared according to Examples 1 to 3 were conditioned by salt grinding and then tested using a solvent-based paint system. Perylenetetracarboxylic diimide made by a conventional batchwise method was used as a control.

Pigment dispersions were prepared using a mixture of 33% AROPLAZ® 1453-X-50 alkyd resin (Reichhold Chemicals, Inc.), 63% xylene, and 4% pigment, which gave a pigment-to-binder ratio of 4:33 and a total solids content of 37%. The pigment-to-binder ratio was reduced 1:10 by addition of 2.3% AROPLAZ® 1453-X-50 alkyd resin and 6.5% RESIMENE® 717 melamine resin (Monsanto Company), which gave a total solids content of 40%. Masstone and transparency measurements were made using films applied at 152 $\mu$m and 38 $\mu$m wet film thickness, respectively, and flashed at room temperature for 30 minutes and at 121° C. for 30 minutes.

Undertone tint paints were prepared from the dispersion described above having a pigment-to-binder ratio of 4:33 by adding 31% of a dispersion prepared from 30% AROPLAZ® 1453-X-50 alkyd resin, 20% xylene, 5% NUOSPERSE® 657 (Huls America), and 50% TI-PURE® R-960 $TiO_2$ pigment (DuPont); 21% AROPLAZ® 1453-X-50 alkyd resin; and 7% RESIMENE® 717 melamine resin, which gave a pigment-to-binder ratio of 1:2, a total solids content of 50%, and a $TiO_2$-to-pigment ratio of 90:10. Color measurements were made using films applied at 76 $\mu$m wet film thickness and flashed at room temperature for 30 minutes and at 121° C. for 30 minutes.

Metallic paints were prepared from the dispersion described above having a pigment-to-binder ratio of 4:33 using an aluminum paste (available as 5251 AR from Silberline Manufacturing Co., Inc.), AROPLAZ® 1453-X-50 alkyd resin, and RESIMENE® 717 melamine resin in quantities that provided a pigment-to-binder ratio of 1:9, an aluminum-to-pigment ratio of 20:80, and a total solids content of 41%. Color measurements were made using films applied at 76 $\mu$m wet film thickness and flashed at room temperature for 30 minutes and at 121° C. for 30 minutes.

Solvent-based paints prepared as described above using pigments of Example 1 to 3 exhibited a deeper and more transparent masstone and a bluer and brighter tint and metallic than a paint prepared using the control pigment.

What is claimed is:

1. A continuous process for preparing perylenes comprising
   (a) continuously mixing a melt of the leuco form of a perylene tetracarboxylic diimide obtained by alkaline fusion of naphthalimide with a continuous water-containing stream comprising
      (1) 2 to 50 parts by weight of water per part by weight of the melt,
      (2) 0 to $X^1$ moles of oxidizing agent per mole of the leuco form of the perylene tetracarboxylic diimide,
      (3) 0 to $Y^1$ parts by weight of processing additives, based on the leuco form of the perylene tetracarboxylic diimide, and
      (4) optionally an acid, to form a slurry;
   (b) optionally mixing the slurry in one or more continuous or batchwise steps with a second stream comprising
      (1) 0 to 10 parts by weight of water, based on the weight of the slurry,
      (2) 0 to $X^2$ moles of oxidizing agent per mole of the leuco form of the perylene tetracarboxylic diimide, with the proviso the total of $X^1$ and $X^2$ represents at least the molar amount of oxidizing agent theoretically needed to oxidize all of the leuco form of the perylene tetracarboxylic diimide,
      (3) 0 to $Y^2$ parts by weight of processing additives, based on the leuco form of the perylene tetracarboxylic diimide, with the proviso that the total of $Y^1$ and $Y^2$ is from 0 to 50 parts by weight, and (4) optionally an acid, to give a perylene pigment;

(c) optionally, isolating the perylene pigment; and (d) optionally, conditioning the perylene pigment.

2. A continuous process according to claim 1 wherein the continuous water-containing stream contains 4 to 20 parts by weight of water per part by weight of the melt.

3. A continuous process according to claim 1 wherein the total of $X^1$ and $X^2$ represents from 1 to 10 times the molar amount of oxidizing agent theoretically needed to oxidize all of the leuco form of the perylene tetracarboxylic diimide.

4. A continuous process according to claim 1 wherein the total of $X^1$ and $X^2$ represents from 2 to 6 times the molar amount of oxidizing agent theoretically needed to oxidize all of the leuco form of the perylene tetracarboxylic diimide.

5. A continuous process according to claim 1 wherein step (a) is carried out in the absence of an oxidizing agent.

6. A continuous process according to claim 1 wherein step (b) is carried out in the absence of an oxidizing agent.

7. A continuous process according to claim 1 wherein the oxidizing agent is oxygen in the form of substantially pure $O_2$, air or other gas mixtures containing oxygen, or ozone; a persulfate; a nitrobenzenesulfonic acid salt; a nitrate; a chlorate; hydrogen peroxide or an adduct of hydrogen peroxide and a borate; or a hypochlorite.

8. A continuous process according to claim 1 wherein in step (a) the melt is not pressurized.

9. A continuous process according to claim 1 wherein in step (a) the melt is pressurized at a positive pressure of up to 10,000 psi.

10. A continuous process according to claim 1 wherein in step (a) the continuous water-containing stream is pressurized at a positive pressure of up to 10,000 psi.

11. A continuous process according to claim 1 wherein in step (b) the second stream is pressurized at a positive pressure of up to 10,000 psi.

12. A continuous process according to claim 1 wherein the total of $Y^1$ and $Y^2$ is zero.

13. A continuous process according to claim 1 wherein an acid is used in sufficient quantity to neutralize all or part of the alkali from the alkaline melt.

14. A continuous process according to claim 13 wherein the acid is a mineral acid.

15. A continuous process according to claim 1 wherein an acid is used in excess relative to the alkali from the alkaline melt.

16. A continuous process according to claim 15 wherein the acid is a mineral acid.

17. A continuous process according to claim 1 wherein in step (a) the temperature is kept constant to within ±2° C.

18. A continuous process according to claim 1 wherein in step (b) the temperature is kept constant to within ±2° C.

19. A continuous process according to claim 1 wherein the perylene pigment product is an oval particle having a particle size between 15 nm and 75 nm.

* * * * *